Figure 1:
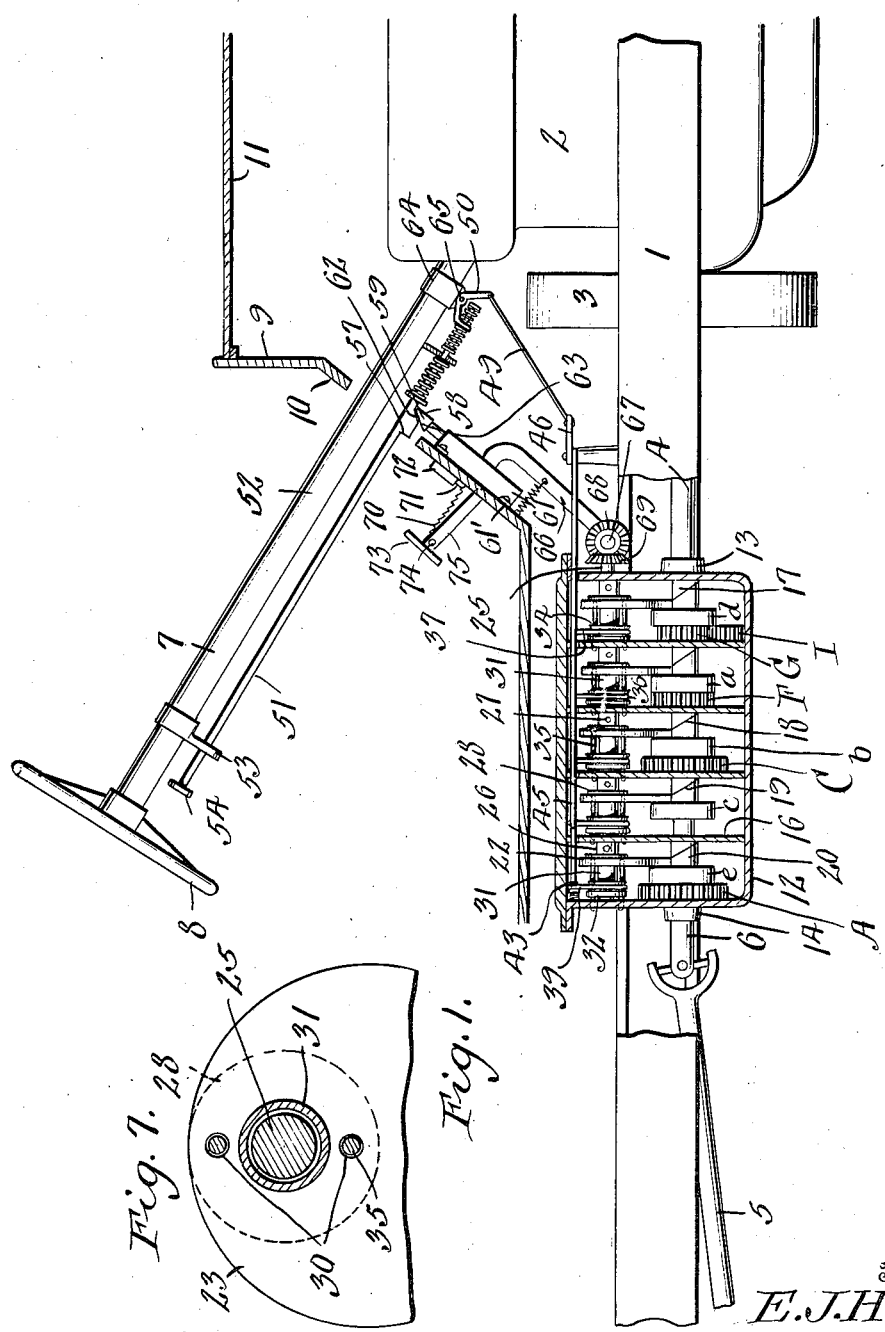

E. J. HOLZE.
TRANSMISSION GEARING.
APPLICATION FILED JAN. 29, 1915.

1,165,258.

Patented Dec. 21, 1915.
3 SHEETS—SHEET 2.

Witnesses

Inventor
E. J. Holze,
By Victor J. Evans.
Attorney

E. J. HOLZE.
TRANSMISSION GEARING.
APPLICATION FILED JAN. 29, 1915.
1,165,258.
Patented Dec. 21, 1915.
3 SHEETS—SHEET 3.
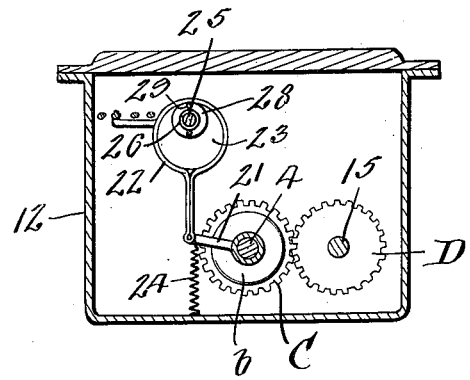
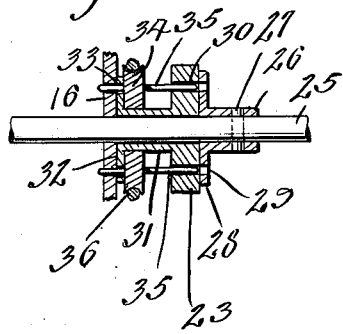
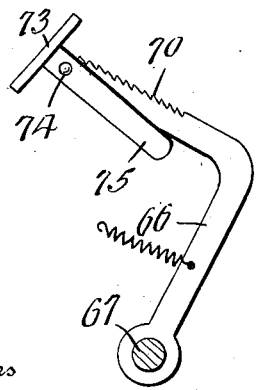
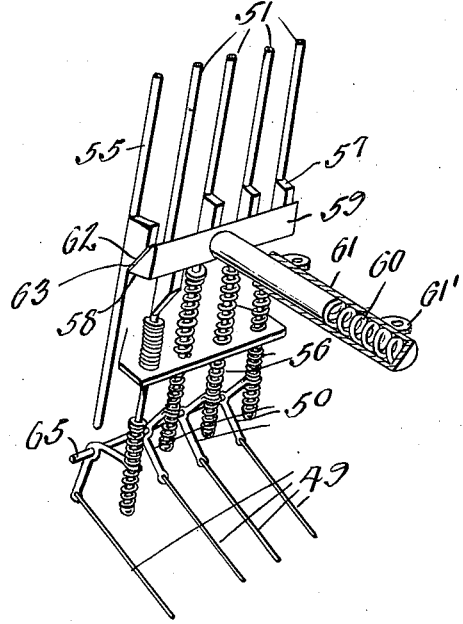
Inventor
E. J. Holze,
By Victor J. Evans
Attorney

UNITED STATES PATENT OFFICE.

EDWIN J. HOLZE, OF MARLIN, TEXAS.

TRANSMISSION-GEARING.

1,165,258.

Specification of Letters Patent. Patented Dec. 21, 1915.

Application filed January 29, 1915. Serial No. 5,088.

*To all whom it may concern:*

Be it known that I, EDWIN J. HOLZE, a citizen of the United States, residing at Marlin, in the county of Falls and State of Texas, have invented new and useful Improvements in Transmission-Gearing, of which the following is a specification.

This invention relates to transmission gearing such as is usually employed in automobile and motor car practice, for varying the speed between the engine, crank shaft and a driven shaft which usually constitutes the drive shaft of the machine, extending from the transmission gearing to the rear axle differential gearing.

The object of the present invention is to provide transmission gearing in which all of the gears remain constantly in mesh; that is to say, the gears are not shifted as in the usual construction but they are arranged in groups and the gears of each group remain constantly in mesh, certain gears being arranged in connection with clutches to be locked to their respective shafts by selective means under the control of the operator.

A further object of the invention is to so arrange the groups of gears that when the driving and driven shafts of the transmission gearing are coupled or clutched directly together for obtaining what is known as direct drive or high speed, all of the gears will remain idle thus materially reducing wear and tear thereon and greatly prolonging the life of the transmission gearing as a whole.

A further object of the invention is to so arrange the connections of the selective mechanism that two groups of gears may be simultaneously thrown into operation thus providing for communicating motion from the driving shaft to the countershaft and back from the countershaft to the driven shaft.

A further object of the invention is to provide a series of operating rods controlling the selective mechanism, and combined with a multiple latch, common to all of said rods, said latch serving to hold the selected connections in operative position after any particular rod has been shifted, and said latch being adapted to be released by the movement of one of said rods, the arrangement being such that when any operating rod is shifted, it automatically operates to release a rod which has been previously shifted.

The mechanism hereinafter described does away entirely with the stripping of gears for the reason that the gears of each group are in constant mesh and for the further reason that on account of the clutch mechanism arranged as hereinafter described, the usual jerking strain is dispensed with causing the car to take up its movement gradually.

With the above and other objects in view, the invention consists in the novel construction, combination and arrangement of parts, as herein described, illustrated and claimed.

Figure 2:
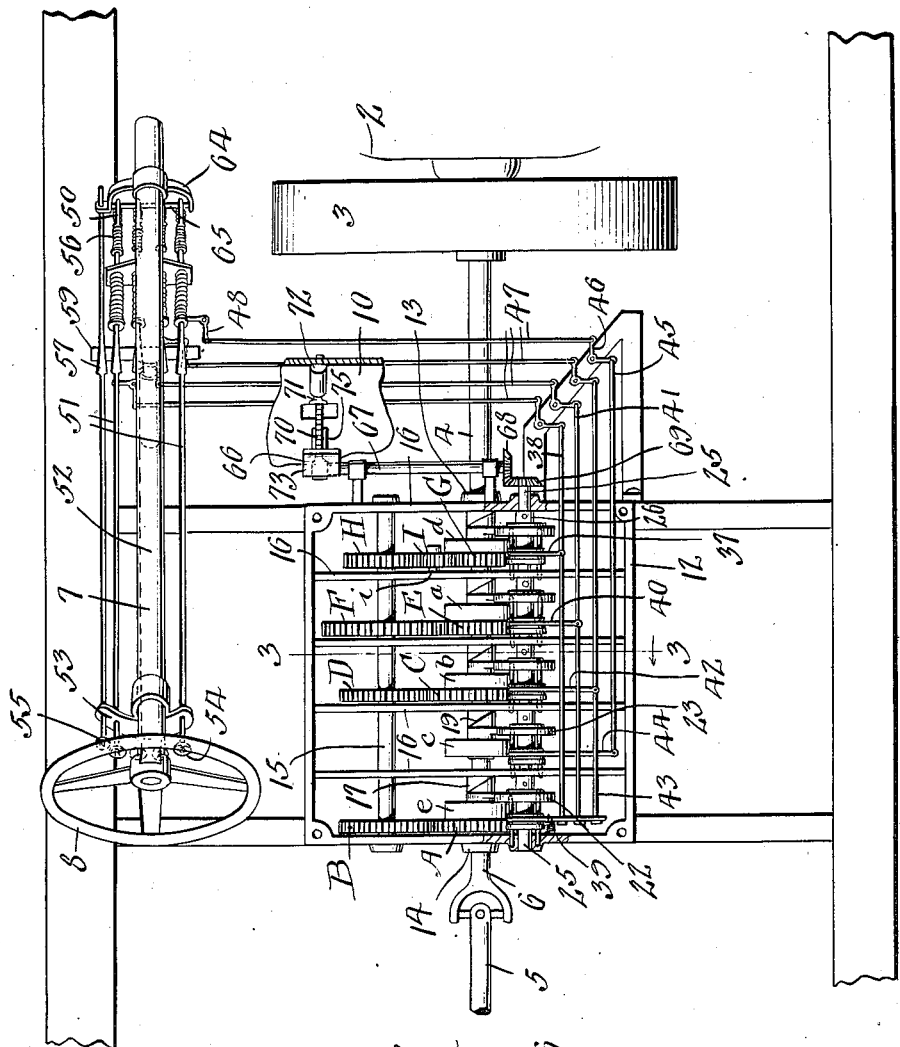
Figure 5:
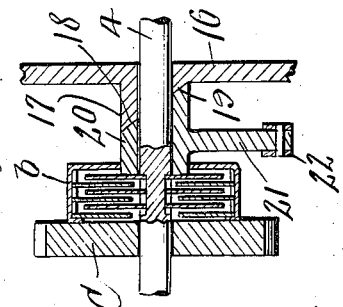

In the accompanying drawings:—Figure 1 is a fragmentary view of an automobile partly in elevation and partly in section illustrating the transmission gearing and controls of this invention. Fig. 2 is a plan view of the same, partly in section and with the top of the transmission case removed. Fig. 3 is a cross section on the line 3—3 of Fig. 2. Fig. 4 is a detail side elevation of the foot lever and pedal showing the shaft thereof in cross section. Fig. 5 is an enlarged sectional view of one of the clutches. Fig 6 is a detail sectional view of one of ea locking devices used in connection with ele clutch showing the operating shaft in elevation. Fig. 7 is an enlarged fragment view partly in elevation and partly in section showing one of the clutch opera members or eccentrics. Fig. 8 is a per tive view on an enlarged scale showin push rods and other parts of the conne for operating the multiple latch.

Referring primarily to Figs. 1 a with the multiple latch, 4 designates the frame or chassis of car, 2 the engine, 3 the fly wheel, 4 gine shaft which will hereinafter be to as the driving shaft, 5 the driv of the machine leading from the sion gearing to the differential g the driving axle, the shaft 5 being to and actuated by a shaft 6 of mission gearing which shaft 6 after be referred to as the driv same being in longitudinal ali the driving shaft 4. 7 designa ing column, 8 the usual hand s 9 the dash, 10 the foot board gine hood, said parts in the the ordinary construction an 12 designates the transmissic the transmission gears are a which is also provided with the driving shaft 4 and a bearing 14 for the driving shaft 6. By reference to Fig. 2 it will be seen that the shafts 4 and 6 are directly in line with each other and are adapted to be directly coupled together by means of a clutch designated generally at $c$. Normally loose on the shaft 6 is a spur gear A which constantly meshes with another spur gear B on a countershaft 15 parallel to the shafts 4 and 6 and journaled in bearings in the transmission case as indicated in Fig. 2. Other gears C and D, E and F, and G, H and I are arranged in groups as shown in Fig. 2, the gears D, F and H being fast on the countershaft 15 and the gears C, E and G being normally loose on the driving shaft 4 while the smaller pinion I is an idler, being mounted in an intermediate stud shaft $i$ of its own. The group or train of gears G, H and I provide for reversing the direction of rotation of the shaft 6 as compared with the shaft 4, the said group of gears G, H and I being used in connection with the group A, B. The group E and F is used in connection with the group A and B to produce what is known as low or first speed. The group C and D is used in conjunction with the group A and B to produce what is known as intermediate speed. The direct clutch $c$ is employed to produce high speed or direct drive. The gear A is locked to the shaft 6 by means of the clutch $e$ and the gears C, E and G are respectively locked to the shaft 4 by means of the clutches $b$, $a$ and $d$.

The means for operating the clutches will be described. The gear case 12 embodies a series of cross partitions or fixed abutments 16 one of which constitutes one of the end walls of the gear case as shown in Fig. 2. On each of said abutments there is a projection 17 provided with a cam face 18 with which another cam face 19 coöperates, the cam face 19 being formed on a cam 20 which is adapted to be oscillated on either the shaft or the case may be, the relation of the clutches $a$, $b$, $c$, $d$ and $e$ to their operating the same and clearly illustrated in detail section Fig. 5 wherein it will be seen that said cam serves to set and release the respective clutch, shown in Fig. 5 being of the clutch $c$ for locking the gear shaft 4. The clutch $c$ is shown as of the ordinary multiple disk type but will, of course, be understood that any other desired form of clutch may be used with the one shown. The cam 20 is provided with an arm 21. This arm 21 is attached to the outer extremity of an eccentric 23 strap 22 of a clutch operating members. The strap 22 is connected to the arm 21 as for the purpose of pulling to its initial position after it has been moved in the opposite direction by the action of the strap 22 operated upon by the eccentric 23. By reference to Figs. 1 and 2 it will be observed that a series of eccentrics and straps is employed, there being one eccentric and one strap for each cam 20 and clutch $a$, $b$, $c$, $d$ and $e$. Normally, all of these eccentrics or clutch operating members are loose on a common clutch operating shaft 25 as illustrated in the detail sectional view Fig. 6 in connection with Fig. 7. Under the preferred embodiment of this feature of the invention, the shaft 25 is provided with a collar 26 fast thereon, being shown as secured to the shaft by a pin or key 27 and provided with a flange 28 formed with a circular series of holes 29. The member 23 is provided with a corresponding series of holes 30 and has an extended hub 31 provided with an end flange 32 formed with another corresponding series of holes 33. Operating between the member 23 and the flange 32 is a sliding member 34 in the form of a collar slidable upon the hub 31 and carrying pins or keys 35 extending transversely therethrough, there being preferably two of such keys or pins arranged diametrically opposite each other and adapted to enter corresponding holes 33 in the flange 32 or holes 30 in the member 23. When the pins 35 are inserted through the holes 30 and 29 of the members 23 and 28, the member 23 which represents the eccentric or clutch operating member 23 is locked to the clutch operating shaft 25 and when the sliding member 34 is moved to the left in Fig. 6, the member 23 is released and not turned by the shaft 25.

Each of the sliding members 34 is shifted by means of a fork 36 which engages a groove in the periphery of said member as shown in Fig. 6. The several forks are adapted to be shifted by mechanism best illustrated in a general way in Fig. 2. The fork controlling clutch for the wheel G is provided with an arm 37 which is attached to an operating rod 38 said rod being extended far enough to provide for its attachment also to the arm 39 of the fork which controls the locking device for the clutch $e$. In like manner the fork controlling the locking member for the fork controlling the locking device for the clutch $a$ is provided with an arm 40 which is attached to another rod 41 also attached to the locking device for the fork which is provided with an arm 42 connected in like manner to an operating rod 43 also connected with the arm 39. The fork which shifts the locking member for the clutch $c$ also has an arm 44 which is attached to another operating rod 45. All of these rods 38, 41, 43, and 45 are shown as arranged parallel to each other and all connected by bell crank levers 46 to a corresponding seriof rods 47 extending transversely of the machine and connected by other bell crank levers 48 to other rods 49 in turn connected by a series of bell crank levers 50 to the lower extremities of a corresponding series of push rods 51 extending substantially parallel to the steering column 52 and having their upper portions slidable through a guide plate 53 shown for convenience as arranged under the hand controlling or steering wheel 8, said rods being provided at their upper extremities with heads or buttons 54 to enable the operator to press the push rods 51 downwardly. In addition to the rods 51, an additional push rod 55 is provided, the same being arranged in parallel relation to the other rods and mounted in the same manner and being used as will hereinafter appear for releasing the multiple latch and bringing the gearing back to a neutral condition. Each of the rods 51 is connected to its bell crank lever 50 by a sliding joint in connection with which a compensating spring 56 is employed so that in case the operator depresses one of the rods 51 too far, it will have no serious effect on the other connections described.

Each of the push rods 51 is provided with a stop shoulder 57 adapted to be engaged by the bottom face 58 of a multiple latch 59 held yieldingly toward the series of push rods 51 and 55 by means of a coiled expansion spring 60 mounted in a combined guide and housing 61 as best illustrated in Fig. 8, said guide and housing being provided with lugs 61' to secure the same in fixed relation to the frame of the machine. Each of the push rods 51 and 55 is further provided with an inclined or cam shoulder 62 adapted to coöperate with a corresponding cam face 63 on the latch 59 so that as any rod 51 or 55 is depressed, the latch 59 is shifted so as to release any other rod which may have previously been engaged and held downwardly by said latch.

64 designates a bracket which supports the shaft 65 on which the bell crank levers 50 are mounted to turn.

66 represents a foot lever which is fast on a rock shaft 67 having fast thereon a bevel gear wheel 68 which meshes with another bevel gear wheel 69 fast on the adjacent end of the clutch operating shaft 25 as shown in Figs. 1 and 2. The upper portion of the lever 66 is provided with a rack face or teeth 70 adapted to be engaged and held by a spring catch 71 shown as mounted in a casing 72 secured to the floor member 10.

73 designates a pedal which is pivotally mounted at 74 on the lever 66 and provided with a trip arm 75 which by rocking the pedal 73 in the proper direction operates against the point of the catch 71 and forces the same out of engagement with the teeth or rack face 70 thereby permitting the lever 66 to be retracted under the action of the springs 24 (see Fig. 3), which act on the straps 22 and thereby on the eccentrics 23 to turn the shaft 25 back to its initial or neutral position.

From the foregoing description, the operation of the transmission gearing will now be understood. Suppose, for example, the transmission gearing is in neutral position and the operator desires to start the car. He pushes downwardly on the proper button 54 which acts through the connecting rods and bell crank levers to shift the fork 36 by means of the arm 40 and simultaneously shift the fork which controls the locking device for the clutch e by means of the arm 39, it being remembered that the arms 40 and 39 are both simultaneously operated by the same rod 41. The operator then depresses the foot lever 66 thereby turning the clutch operating shaft 25 and locking the gear E to the shaft 4 and the gear A to the shaft 6. The motion of the shaft 4 is now transmitted through the gears E and F to the countershaft 15 and then through the gears B and A to the shaft 6. The machine is now in what is known as low speed. In the same way the operator throws the machine into second speed by depressing the proper button 54 so as to lock the wheel A to the shaft 4. The drive is then from the shaft 4 through the wheels C and D, the countershaft E and the wheels B and A to the shaft 6. To obtain high speed or direct drive, the proper button 54 is depressed, thereupon connecting the shaft 4 directly to the shaft 6 by means of the clutch c. Reverse gear is effected by operating the clutch d thereby locking the wheel G to the shaft 4. The drive is then from the shaft 4 through the gears G, I and H to the countershaft 15 and then through the gears B and A to the shaft 6. To throw the gearing into neutral or inoperative condition, the operator depresses the rod 55 which merely has the effect of tripping the multiple latch 59 and allowing the previously depressed rod 51 to move back to its initial position. As a whole, the construction and operation of the transmission gearing and operating means therefor is extremely simple. All the operator is required to do is to first depress the proper button 54 which leaves all of the other rods 51 free and also releases any one of the rods which may have previously been depressed and held by said latch. After depressing the proper button 54, the operator then depresses the foot lever 66 until it is caught and held by the catch 71 coöperating with the teeth 70.

It will be observed that the gears of the several groups in the transmission case are always in mesh whether idle or working and that the gears of the shafts 4 and 6 are taken up gradually without any jerking motion by the engagement of the clutches *a*, *b*, *c*, *d* and *e*. When in high speed, all of the gears both on the shafts 4 and 6 and on the shaft 15 are still thus reducing wear and tear to a minimum. All of the gears revolve in oil, the transmission case 12 being made oil tight for that purpose. The clutches also work in oil so that wear thereon is reduced to a minimum and any sudden gripping or seizing of the clutch faces is avoided thus enabling the car to start easily and without undue or excessive strains on the gears or clutches or other parts of the transmission gearing as a whole. Thus it is practically impossible for the gears to strip or be injured as in the case of the present day gear shifting construction in which certain of the gears are shifted into and out of actual mesh every time a different speed is desired.

What I claim is:—

1. Transmission gearing embodying, in combination, a driving shaft, a driven shaft in longitudinal alinement therewith, a countershaft parallel to said driving and driven shafts, changeable speed gears on all of said shafts arranged in groups, the gears on the countershaft being fast, and the gears on the driving shaft being normally loose and always in mesh with the gears on the countershaft, a clutch for locking each driving and driven shaft gear to its shaft, a clutch operating shaft parallel to said driving and driven shafts, a series of clutch operating eccentrics normally loose on said clutch operating shaft, manually controlled means for selectively locking said clutch operating eccentrics to their shaft, and means for turning said clutch operating shaft.

2. Transmission gearing embodying, in combination, a driving shaft, a driven shaft in longitudinal alinement therewith, a countershaft parallel to said driving and driven shafts, changeable speed gears on all of said shafts arranged in groups, the gears on the countershaft being fast, and the gears on the driving shaft being normally loose and always in mesh with the gears on the countershaft, a clutch for locking each driving and driven shaft gear to its shaft, a clutch operating shaft parallel to said driving and driven shafts, a series of clutch operating members normally loose on said clutch operating shaft, manually controlled means for selectively locking said clutch operating members to their shaft, means for turning said clutch operating shaft, push rods for selectively shifting said locking means, and a multiple latch common to and for all of said rods and adapted to be tripped by one of said rods.

In testimony whereof I affix my signature in presence of two witnesses.

EDWIN J. HOLZE.

Witnesses:
 OSIE BARTON,
 L. C. HOLZE.